United States Patent [19]

Miller et al.

[11] Patent Number: 4,707,281

[45] Date of Patent: Nov. 17, 1987

[54] DRILLING FLUID ADDITIVE CONTAINING HIGH PYRUVATE XANTHAN

[75] Inventors: James W. Miller, Ledyard; John J. O'Neill, Norwich, both of Conn.

[73] Assignee: Pfizer Inc., New York, N.Y.

[21] Appl. No.: 740,658

[22] Filed: Jun. 3, 1985

[51] Int. Cl.$^4$ ................................................ C09K 7/02
[52] U.S. Cl. ................................ 252/8.514; 252/8.51; 252/8.551; 252/315.3
[58] Field of Search ............... 252/8.5 A, 8.5 C, 315.3, 252/8.51, 8.514, 8.551; 435/104

[56] References Cited

U.S. PATENT DOCUMENTS

| | | | |
|---|---|---|---|
| 3,018,245 | 1/1962 | Owen | 252/8.5 |
| 3,198,268 | 8/1965 | Lindblom et al. | 252/8.5 X |
| 3,557,016 | 1/1971 | Schuppner | 252/316 |
| 3,988,246 | 10/1976 | Hartfiel | 252/8.5 |
| 4,046,197 | 9/1977 | Gruesbeck et al. | 252/8.5 X |
| 4,119,546 | 10/1978 | Wernau | 252/8.55 |
| 4,322,301 | 3/1982 | Blackmore | 252/8.5 A |

OTHER PUBLICATIONS

Sandford et al., *Am. Chem. Soc. Symp. Ser.*, 1977, 45, pp. 192–210.

Philips et al., SPE Paper 10617, Dallas, Tex., Symposium on Oil Field and Geothermal Chemistry, Jan. 1982.

*Primary Examiner*—Herbert B. Guynn
*Attorney, Agent, or Firm*—Peter C. Richardson; Lawrence C. Akers; Gezina Holtrust

[57] ABSTRACT

A drilling fluid additive comprises high pyruvate xanthan and locust bean gum in a weight ratio of about 40:60 to 80:20. The additive increases the viscosity of the drilling fluid at low shear, has improved thermal stability, and increases the capacity of the fluid to suspend high density weighting materials.

16 Claims, 1 Drawing Figure

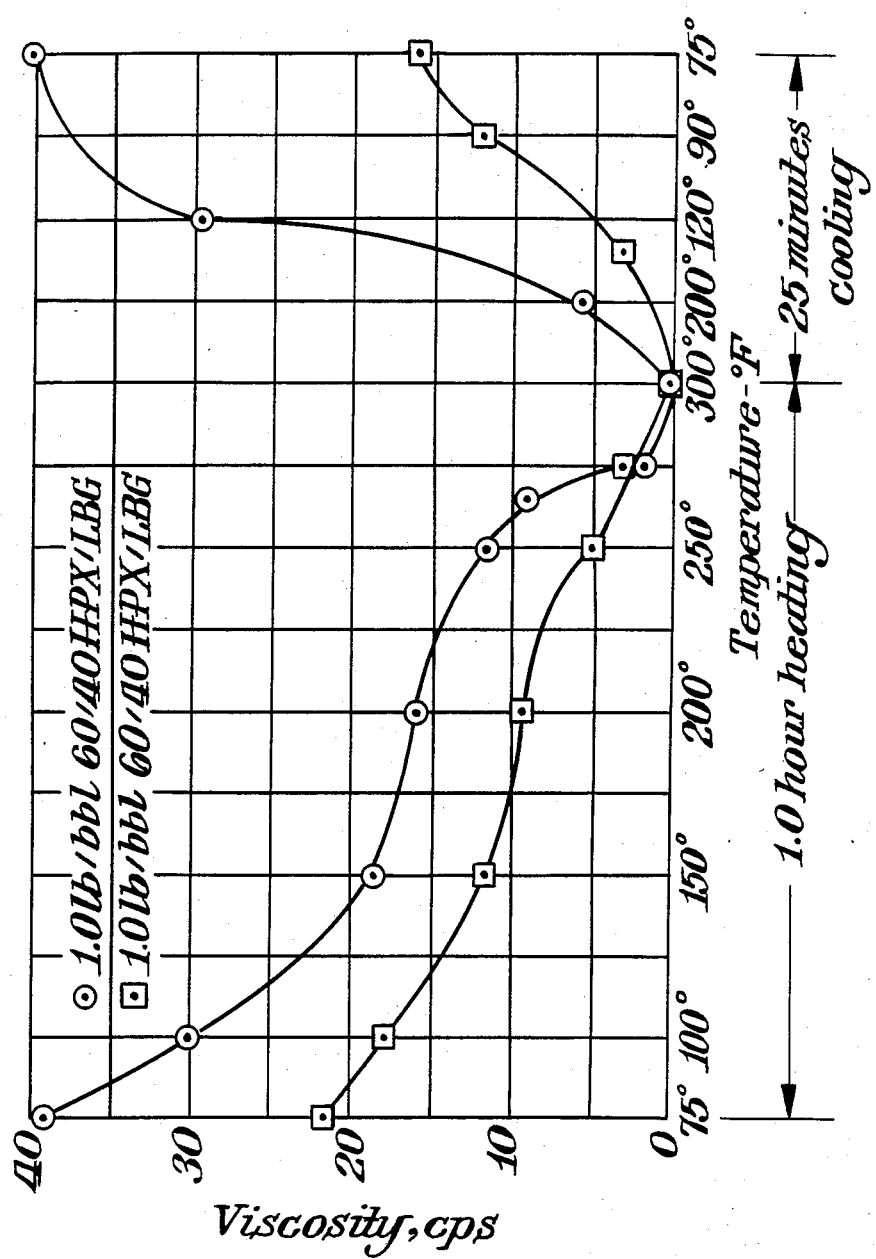

DRILLING FLUID ADDITIVE CONTAINING HIGH PYRUVATE XANTHAN

BACKGROUND OF THE INVENTION

The present invention is concerned with water-based fluids employed in the drilling of oil, gas and other wells such as geothermal wells. The invention is also concerned with an additive for such drilling fluids and with methods for drilling wells employing such fluids.

Water-based drilling fluids, often called "drilling muds" since many comprise clay particles in aqueous dispersion, are commonly employed as follows. The fluid is pumped down a hollow drill pipe and, at high velocity and high shear (more than 500 sec$^{-1}$), through the orifices or "jets" of the drill bit located at the bottom of the drill pipe. In this way the fluid cools and lubricates the drill bit and rapidly removes rock cuttings made by the cutting action of the bit. To accomplish this task, the fluid should ideally have little or no resistance to flow, i.e. low viscosity. The drilling fluid must then carry out of the bore-hole the rock cuttings and other solids incorporated into the drilling fluid, e.g. weighting materials such as barite added to the drilling fluid to increase its density. This is done by pumping the fluid back to the well surface at lower velocities and lower shear rates (less than 200 sec$^{-1}$) through the "annulus," the hole outside the drill pipe made by the drill bit. To prevent cuttings, weighting materials, and other solids from slipping back down the annulus during both drilling and drilling interruption periods, the fluid should have a relatively high viscosity during this phase of the drilling fluid circulation. Such fluids which exhibit low viscosities under high shear and high viscosities under low shear are commonly called "pseudoplastic" fluids.

In addition, because downhole temperatures may exceed 150° F., e.g. may range from 150° to 400° F. (65° to 204° C.), the fluid's components should not degrade on exposure to these higher temperatures. The latter is particularly important during the drilling phase where successful transport of cuttings and other solids up the annulus depends on a fluid's capacity to yield high viscosity at low shear following exposure to high downhole temperatures. It should be noted that the drilling fluid cools significantly during its return trip to the surface as well as on reaching surface "mud pits" or fluid storage tanks. This permits the use of fluids which may lose most of their viscosity on brief exposure to high downhole temperatures provided substantial viscosity is regained on the return trip to the surface. At the surface, cuttings are removed, the drilling mud is cooled to near-ambient temperature and additional additives are mixed into the mud to restore the mud to initial properties.

Many drilling fluids have been described in the art. For instance, U.S. Pat. No. 4,322,301 describes a water-based drilling fluid which is used at high drilling temperatures occurring during deep drilling.

In general, currently used drilling fluids which employ materials other than clays as viscosifiers lose their low shear viscosity imparting properties after brief exposure to temperatures of about 300° F. (about 150° C.) or higher. Such high temperatures are commonly found in deep wells where weighting additives are needed to prevent the influx of downhole formation water into the drilling fluid as well as in more shallow hot wells, such as geothermal wells. In general, these same drilling fluids do not possess sufficient low shear viscosity to adequately suspend moderate levels of weighting materials (e.g. 12 lb/gal barite) in surface tanks where mean shear rates are substantially reduced (e.g. to 1–10 sec$^{-1}$) and there is little "forward movement" of the fluid to help maintain high density weighting materials like barite in suspension.

It is an object of the invention to provide a pseudoplastic drilling fluid having increased thermostability as well as increased capacity to suspend solids present during both shallow and deep well drilling. It is a further object of the invention to provide a drilling fluid with increased capacity to suspend high density weighting materials while said fluid is being held in a surface mud pit or storage tank.

U.S. Pat. No. 3,557,016 describes a composition comprising Xanthomonas hydrophilic colloid and locust bean gum. The patent discloses a medium pyruvate xanthan containing medium amounts of pyruvic acid of less than 5 percent by weight. The composition disclosed forms a gelatinous product with water and is utilized in the production of a variety of food products. Application of the composition in well drilling is not disclosed.

SUMMARY OF THE INVENTION

This invention relates to a drilling fluid additive comprising high pyruvate xanthan and locust bean gum, generally in a ratio ranging from about 40:60 to 80:20, preferably about 60:40. In accordance with the invention, high pyruvate xanthan is a xanthan containing a high percentage of pyruvic acid, generally about 5 to 9 percent by weight, preferably about 7 to 8 percent by weight. For comparison, medium pyruvate xanthan has a pyruvic acid content of about 2 to 4% more typically from 3 to 4% by weight.

The invention also relates to drilling fluids containing an additive comprising high pyruvate xanthan and locust bean gum and to a well drilling process recovering water, oil, or gas from water-bearing, oil-bearing, or gas-containing formations by use of drilling fluids containing the additive comprising high pyruvate xanthan and locust bean gum.

DESCRIPTION OF THE DRAWING

FIG. 1 presents a viscosity-temperature curve of aqueous solutions of a comparative viscosity control additive, and a viscosity control additive according to the invention.

DETAILED DESCRIPTION OF THE INVENTION

The high pyruvate xanthan present in the additive of the invention may be prepared from the Xanthomonas fermentation broth described in U.S. Pat. No. 4,119,546. Other methods of obtaining the high pyruvate xanthan are described in the prior art, e.g. Phillips et al., Soc. Pet. Eng. Paper 10617, Dallas, Tex., Symposium on Oil field and Geothermal Chemistry, January 1982. The percentage pyruvic acid in xanthan may be determined by standard assay described in Duckworth and Yaphe, Chem. Ind., 747 (1970).

The blends of high pyruvate xanthan and locust bean gum are generally prepared by dry blending finely divided powders of each of the above components. The solid blend is added, as usual, by pouring into a mud hopper down a shoot into a mud pit equipped with a mechanical low shear stirrer.

The drilling fluid additive is present in the drilling fluid in amounts which are conventional in the drilling industry when adding viscosity control additives to drilling fluids. The amounts usually range from about 0.2 to 5 pounds per barrel of drilling fluid. One pound of additive per barrel of fresh water corresponds to about 2850 ppm.

One or more other additives may be added to the drilling fluid of the invention. These additives are known, for instance polymeric materials, shale tailings, bentonite clays, weighting agents to increase the drilling fluid density, lubricating oil for bit lubrication, anti-scalants to prevent corrosion and dispersants to disperse clay particles to avoid aggregation thereof. Examples of known preferred weighting agents are barite, bentonite and iron carbonate. Preferred fluid densities of drilling fluids used in deep well drilling and drilling for geothermal wells range from 10 to 18 pounds of solids per gallon of drilling fluid.

After circulation of the drilling fluid through the borehole and back to the surface, the solids suspension is passed over vibrating pans and filtered through a very coarse filter to separate the bigger particles of about 0.25 inch diameter or more. Smaller particles may be removed by passage of the fluid through finer filters or by centrifugation.

After removal of these particles, the drilling fluid is passed to a mud pit of re-use. The viscosity of the drilling mud is measured and new additive is added if necessary. Different muds are used dependent on the particular drilling use, e.g. for deeper wells, weighting agents are generally necessary to prevent influx of downhole formation water into the drilling fluid.

The drilling fluid additive of the invention may also be used in completion fluids. Before recovery of oil or gas from a well, a completion fluid is used for a final clean-up of the drilling pipe and bit, and for counteraction of formation fluid pressures downhole in the final stages just before the well is allowed to flow. Also, as is well-known, completion fluids may be used during well-bore stimulation and setting of production casing.

The following Examples illustrate the properties of the drilling fluid additive of the invention.

In each Example, the additive of the invention comprises 40% locust bean gum (LBG) and 60% high pyruvate xanthan (HPX) containing 7.8% pyruvic acis and the comparative additive comprises 40% locust bean gum and 60% medium pyruvate xanthan (MPX) containing 4% pyruvic acid.

EXAMPLE 1

The viscosity of North Sea brine containing an additive of the invention or a comparative additive was measured as a function of temperature to determine the thermostability of each additive.

The North sea brine contained 3.5% total dissolved salts as follows:
23.84 g/l NaCl
1.24 g/l CaCl$_2$
10.76 g/l MgCl$_2$.6H$_2$O
4.29 g/l Na$_2$SO$_4$
0.21 g/l NaHCO$_3$ FIG. 1 presents the curve resulting from plotting the viscosities in centipoises against the temperature in degrees Fahrenheit.

The viscosity was measured at a constant shear of 100 rpm (170 sec$^{-1}$) with a Fann 50 HT viscometer. The brine solutions were heated from 75° F. (24° C.) to 300° F. (149° C.) over one hour and then cooled to 75° F. over 25 minutes. The viscosities were measured at the temperatures indicated in FIG. 1.

The viscosity control additive of the invention and the comparative additive were used each in an amount of 1 pound per barrel (2850 ppm) of North Sea brine.

At 75° F., the additive of the invention imparted a viscosity of 40 cps and the comparative additive imparted a viscosity of 22 cps. At 300° F., the viscosities of the fluids were both virtually zero. On subsequent cooling to 75° F., the original viscosity of the brine containing the additive of the invention was regained whereas there was 74% viscosity regain for the brine containing the comparative additive. Thus, the blend containing medium pyruvate xanthan gum was less thermally stable. The drilling fluid containing the additive of the invention can be used again since there is virtually no loss of viscosity on cooling after heating.

EXAMPLE 2

The viscosity effectiveness at low shear was measured for the additive of the invention and the comparative additive. The viscosities of the different brines having the different additives are listed in Table 1. The viscosity was measured in a Brookfield LVT viscometer, spindle No. 1, at 1.5 rpm (about 0.3 sec.$^{-1}$) at 25° C.

The synthetic seawater was water containing 3.5% total dissolved salts. The high hardness synthetic brine contained 7.3% total dissolved salts in water and had the following salt composition:
64.22 g/l NaCl
5.51 g/l CaCl$_2$
7.23 g/l MgCl$_2$.6H$_2$O
0.01 g/l BaCl$_2$.2H$_2$O
0.14 g/l NaHCO$_3$ The data below clearly show that the viscosity of the solutions containing the additive of the invention was substantially higher than the viscosity of the same solutions containing the comparative additive.

The additives were added in a concentration of 1 pound per barrel of brine.

TABLE 1

| Sample | Brine | Viscosity (cps) |
| --- | --- | --- |
| 60/40 HPX/LBG | Synthetic Seawater | 3320 |
| 60/40 MPX/LBG | " | 480 |
| 60/40 HPX/LBG | High hardness synthetic brine | 2440 |
| 60/40 MPX/LBG | " | 560 |
| 60/40 HPX/LBG | Distilled Water | 7100 |
| 60/40 MPX/LBG | " | 1000 |

EXAMPLE 3

The suspension capabilities of the additive of the invention and the comparative additive were determined.

A 500 ml sample was taken from a barite suspension containing 12 pounds of barium sulfate per gallon of brine and 1 pound of the additive per barrel of brine.

The density of the top 100 ml of the 500 ml sample suspension was determined and the density was again measured after aging of the suspension for 84 hours at room temperature.

The HPX-containing suspension did not show any change in density on aging evidencing that no settling of the barite had occurred.

The MPX-containing suspension showed a decrease in density from 1.44 to 1.01 g/cc in deionized water evidencing almost total settling of the barium sulfate. The MPX-containing suspension showed a decrease in density from 1.44 to 1.19 g/cc in 26% by weight NaCl solutions evidencing almost total settling, the density of 26% by weight NaCl being about 1.2 g/cc.

TABLE 2

| Sample | Brine | Density (g/cc) Initial | Density (g/cc) After 84 hours |
| --- | --- | --- | --- |
| 60/40 HPX/LBG | Deionized Water | 1.43 | 1.43 |
| 60/40 MPX/LBG | " | 1.44 | 1.01 |
| 60/40 HPX/LBG | 26% w/w NaCl (saturated) | 1.43 | 1.43 |
| 60/40 MPX/LBG | 26% w/w NaCl (saturated) | 1.44 | 1.19 |

What is claimed is:

1. A drilling fluid which comprises water, solids to increase the drilling fluid density and an additive comprising high pyruvate xanthan containing about 5 to 9 percent by weight pyruvic acid and locust bean gum wherein the weight ratio of high pyruvate xanthan to locust bean gum is from about 40:60 to 80:20, said additive being present in an amount of about 0.2 to 5 pounds per barrel of drilling fluid.

2. A drilling fluid according to claim 1 wherein the weight ratio of high pyruvate xanthan to locust bean gum is about 60:40.

3. A drilling fluid according to claim 1 wherein said high pyruvate xanthan contains 7 to 8 percent by weight pyruvic acid.

4. A drilling fluid according to claim 3 wherein said solids are selected from the group consisting of barite, hematite and iron carbonate.

5. A process for improving the viscosity or the solids suspension properties of a water base drilling fluid containing solids to increase the drilling fluid density which comprises adding to said fluid an amount of about 0.2 to 5 pounds per barrel of drilling fluid of an additive comprising high pyruvate xanthan containing about 5 to 9 percent by weight pyruvic acid and locust bean gum, in a weight ratio of high pyruvate xanthan to locust bean gum of from about 40:60 to 80:20.

6. A process according to claim 5 wherein said high pyruvate xanthan and locust bean gum are present in a weight ratio of about 60:40.

7. A process according to claim 5 wherein said high pyruvate xanthan contains about 7 to 8 percent by weight pyruvic acid.

8. A process according to claim 5 wherein said solids are selected from the group consisting of barite, hematite and iron carbonate.

9. A process according to claim 5 wherein said drilling fluid has been exposed to temperatures of about 65° to 204° C.

10. A process for drilling wells which comprises circulating during drilling a water base drilling fluid comprising water and an additive comprising high pyruvate xanthan containing about 5 to 9 percent by weight pyruvic acid and locust bean gum, in a weight ratio of high pyruvate xanthan to locust bean gum of from about 40:60 to 80:20, said additive being present in an amount of about 0.2 to 5 pounds per barrel of drilling fluid.

11. A process according to claim 10 wherein the weight ratio of high pyruvate xanthan to locust bean gum is about 60:40.

12. A process according to claim 10 wherein said high pyruvate xanthan contains about 7 to 8 percent by weight pyruvic acid.

13. A process according to claim 10 wherein said drilling is at temperatures of about 65° to 204° C.

14. A process for cleaning up a drilling pipe and bit used in drilling wells which comprises circulating before recovery of gas or oil from a well a water base completion fluid comprising water and an additive comprising high pyruvate xanthan containing about 5 to 9 percent by weight pyruvic acid and locust bean gum, in a weight ratio of high pyruvate xanthan to locust bean gum of from about 40:60 to 80:20.

15. A process according to claim 14 wherein the weight ratio of high pyruvate xanthan to locust bean gum is about 60:40.

16. A process according to claim 14 wherein said high pyruvate xanthan contains about 7 to 8 percent by weight pyruvic acid.

* * * * *